(12) United States Patent
Marsh et al.

(10) Patent No.: US 7,844,263 B2
(45) Date of Patent: Nov. 30, 2010

(54) PROVISIONING A USER DEVICE FOR MULTIPLE SERVICES

(75) Inventors: William Marsh, Austin, TX (US); Charles Gamble, Woodbridge, CT (US)

(73) Assignee: Tangoe, Inc., Orange, CT (US)

( * ) Notice: Subject to any disclaimer, the term of this patent is extended or adjusted under 35 U.S.C. 154(b) by 209 days.

(21) Appl. No.: 11/741,433

(22) Filed: Apr. 27, 2007

(65) Prior Publication Data

US 2007/0293264 A1 Dec. 20, 2007

Related U.S. Application Data

(60) Provisional application No. 60/795,295, filed on Apr. 27, 2006.

(51) Int. Cl.
*H04M 3/00* (2006.01)
*H04M 1/00* (2006.01)

(52) U.S. Cl. .................................. 455/418; 455/552.1

(58) Field of Classification Search ......... 455/405–408, 455/414.1, 418–419, 432.3, 432.2, 552.1, 455/558; 379/112.05; 705/26, 27
See application file for complete search history.

(56) References Cited

U.S. PATENT DOCUMENTS

| | | | | |
|---|---|---|---|---|
| 6,029,143 A | * | 2/2000 | Mosher et al. ................ | 705/28 |
| 6,997,379 B2 | * | 2/2006 | Boyce et al. ................ | 235/380 |
| 7,110,751 B1 | * | 9/2006 | Overby ........................ | 455/418 |
| 7,324,473 B2 | * | 1/2008 | Corneille et al. ............ | 370/328 |
| 2003/0013434 A1 | * | 1/2003 | Rosenberg et al. .......... | 455/414 |
| 2004/0137890 A1 | * | 7/2004 | Kalke .......................... | 455/418 |
| 2005/0083846 A1 | * | 4/2005 | Bahl ............................ | 370/236 |
| 2005/0198306 A1 | * | 9/2005 | Palojarvi et al. ............ | 709/227 |

OTHER PUBLICATIONS

International Search Report and Written Opinion, dated Aug. 19, 2008.

* cited by examiner

*Primary Examiner*—George Eng
*Assistant Examiner*—Nam Huynh
(74) *Attorney, Agent, or Firm*—Thomas, Kayden, Horstemeyer & Risley, LLP

(57) ABSTRACT

Systems and methods for provisioning an electronic device for multiple services are disclosed herein. An exemplary embodiment, among others, of a provisioning method includes receiving a first request to procure a user device capable of operating under a plurality of service plans. The method also includes receiving a second request to provision the user device for operation under a first service plan and receiving a third request to provision the user device for operation under a second service plan. Also, the method includes coordinating the first request, second request, and third request to provision the user device under the first service plan and second service plan.

21 Claims, 10 Drawing Sheets

US 7,844,263 B2

PROVISIONING A USER DEVICE FOR MULTIPLE SERVICES

CROSS-REFERENCE TO RELATED APPLICATIONS

This application claims the benefit of U.S. provisional application No. 60/795,295, filed Apr. 27, 2006, which is incorporated by reference herein.

TECHNICAL FIELD

The present disclosure generally relates to procuring an electronic device capable of operating in association with multiple subscriber services. More particularly, the present disclosure relates to systems and methods for provisioning such a device for multiple services.

BACKGROUND

Telecommunication devices capable of both wireless local area network (WiLAN) and wireless wide area network (WiWAN) connectivity services are generally referred to as Fixed-Mobile Converged (FMC) devices. Currently, manufacturers have been developing FMC devices and the corresponding network infrastructure equipment to support both WiLAN service (the "fixed" service) and WiWAN service (the "mobile" service). A user of such a device would then be able to access communications services (voice, data, video, etc.) on a public or private WiLAN network or WiWAN network. The WiLAN network can be accessed via an interface, such as but not limited to IEEE 802.11a/b/g specifications (WiFi), when such a network is within range of the device and available to the user. WiLAN could be a logical partitioning of the WiWAN network. The WiWAN network can be accessed via an interface, such as one provided by a wireless carrier using an interface conforming to the Global System for Mobile (GSM) communication or Code Division Multiple Access (CDMA) or other interface, when a user is not within the range or does not have permission to access a WiLAN network.

A typical use of an FMC device would be to allow a member of an organization (which could be the employee of a company, governmental department, or agency or even a member of a family) to access the organization's private WiLAN network for the purpose of making or receiving calls. For example, the private WiLAN network may include Voice over Internet Protocol (VoIP) technology, such as a system referred to as a wireless PBX. The member can send or access data while in the range of the organization's private WiLAN network, and, in addition, can utilize the public WiWAN network provided by a wireless common carrier when not in the range of an available WiLAN network.

FIGS. 1 and 2 show flow diagrams of methods currently used by a member of an organization to procure and provision an FMC device and related services. Reference is first made to FIG. 1. In step (1), using one of several different processes (e.g., going to a retail store, ordering from a carrier service representative over the phone, purchasing over the Internet), a member or someone acting on behalf of the member procures an FMC device. This process also includes ordering or requesting a WiWAN service and routing the order to be approved by an administrator of the organization. Upon approval, the FMC device is shipped (step (1) to step (2)) to a fulfiller, for example, for fulfilling the WiWAN service for the device. Part of this process involves the purchase of a corresponding WiWAN service or, if the member already has a WiWAN service, (2) the assignment of that WiWAN service including the transfer or port of that service, from one carrier to another, to the new FMC device.

Once the purchase of the FMC device and initiation or transfer of WiWAN service has been affected, the device is shipped back to the member. At this point, the device is provisioned or configured only for WiWAN and would then need to be provisioned on the WiLAN infrastructure. This process would include, among other things, (3) forwarding the FMC device to an administrator for the generation of a user profile in the WiLAN infrastructure, (4) the loading of an application on the FMC device by the administrator, and (5) the programming of the FMC device to be able to access one or more WiLAN systems by the administrator. After these steps, the FMC device is finally (6) returned to the member for use.

With reference to FIG. 2, a method 200 includes requesting a device capable of local area service and a wide area wireless service, as in block 202. In block 204, the device configured for wide area service is received. In block 206, the local area service administrator is contacted to request local area service. In decision block 208, the administrator confirms whether or not the device is compatible. If not, the flow proceeds to block 209, in which the device is returned to the vendor for configuring or provisioning the device. If the device is confirmed as being compatible in block 208, flow proceeds to block 210.

In block 210, the member seeks approval from the administrator for local area wireless service. In decision block 212, it is determined whether or not the request for local area wireless service is denied. If so, the method returns to the beginning (block 202) to start the process over. If the request is not denied, the device is delivered to the local area service administrator (block 214). In block 216, the device is programmed according to device profiles, e.g. MAC address, mapping information, etc. In block 218, the administrator programs the local area service infrastructure of the organization to enter device profiles, member profiles, etc., into the system. In block 220, the device is returned to the user. The steps of method 200 include tasks associated with the tasks required by a member, user, and/or administrator to procure and provision the device.

Thus, it is apparent that current methods used by telecom and IT departments within organizations to procure and provision such FMC devices are complex, time-consuming, and expensive. Also, the burden of procuring and provisioning falls on the procurer and administrator. Consequently, the conventional methods represent a significant impediment to the large-scale deployment of FMC devices and services. There is therefore a need in this industry to overcome these deficiencies and inadequacies of current FMC deployment methods to better streamline the process of procuring and provisioning these FMC devices or other multi-service type devices.

SUMMARY

The present disclosure describes methods, such as business methods, and systems for provisioning a device to be used for operating in connection with multiple services. In a method, representing one embodiment among others, the method includes receiving a first request to procure a user device capable of operating under a plurality of service plans. Also, the method includes receiving a second request to provision the user device for operation under a first service plan and receiving a third request to provision the user device for operation under a second service plan. In addition, the method includes coordinating the first request, second request, and third request to provision the user device under the first service plan and second service plan.

Another embodiment disclosed herein is directed to a business method. The business method includes, for example, receiving, in a centralized location, a first request to procure an electronic device, a second request to provision the electronic device for a first communication service, and a third request to provision the electronic device for a second communication service. The business method also includes providing orders from the centralized location to one or more remote locations. The orders include instructions to provision the electronic device for the first communication service and the second communication service.

The present disclose also provides systems, in which one embodiment, among others, includes a system comprising memory, a processor, and a network interface. The memory is configured to store a program for provisioning an electronic device. The processor is configured to execute the program stored in memory. The network interface is configured to allow an external user to enter a request for procuring a user device and for provisioning the user device for a plurality of services. The processor processes the request by ordering the requested user device and managing the provisioning of the requested user device for the plurality of services.

The present disclosure further described computer software and programs for providing instruction for provisioning a user device. In one embodiment a computer program is stored on a computer-readable medium for execution by a processing device. The computer program, in this embodiment, comprises logic that allows a first request to be received at a centralized location, logic that allows a second request to be received at the centralized location, and logic that allows a third request to be received at the centralized location. The program also includes logic configured to coordinate the first request, second request, and third request. The first request is associated with an electronic device, the second request is associated with a first service being assisted by the electronic device, and the third request is associated with a second service being assisted by the electronic device.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENT

The present disclosure describes improvements for the process of procuring and provisioning a user device. The user device, in this disclosure, may be a Fixed-Mobile Converged (FMC) device adapted for wireless local area network (WiLAN) service and wireless wide are network (WiWAN) service. In some embodiments, the user device is a device capable of being configured for a plurality of various types of services, such as, for example, wireless or land-line telecommunications services, television services, data services, music services, game services, or others.

In order to facilitate the increased likelihood of large-scale deployment of such user device, particularly within an organization or business, the embodiments described in the present disclosure can reduce the inadequacies of the conventional methods of procuring and provisioning the user device. In the examples described herein, a member, who might be using the provisioned user device, may be a member or employee of an organization, business, family, or other group of users.

The systems and methods described herein can reduce the number of sequence steps and the complexity of the process. The present disclosure describes improved methods for provisioning a user device for both WiWAN and WiLAN services at substantially the same point in time when the user device is procured. Computer programs are also disclosed herein for transacting the procurement and provisioning of the device to accommodate multiple services. The computer programs may also include logic for configuring the device for compatibility with and among the services. The following description includes exemplary embodiments designed to simplify the procurement and provisioning methods and to promote a more desirable deployment process for deploying multi-service devices to members.

Figure 1:
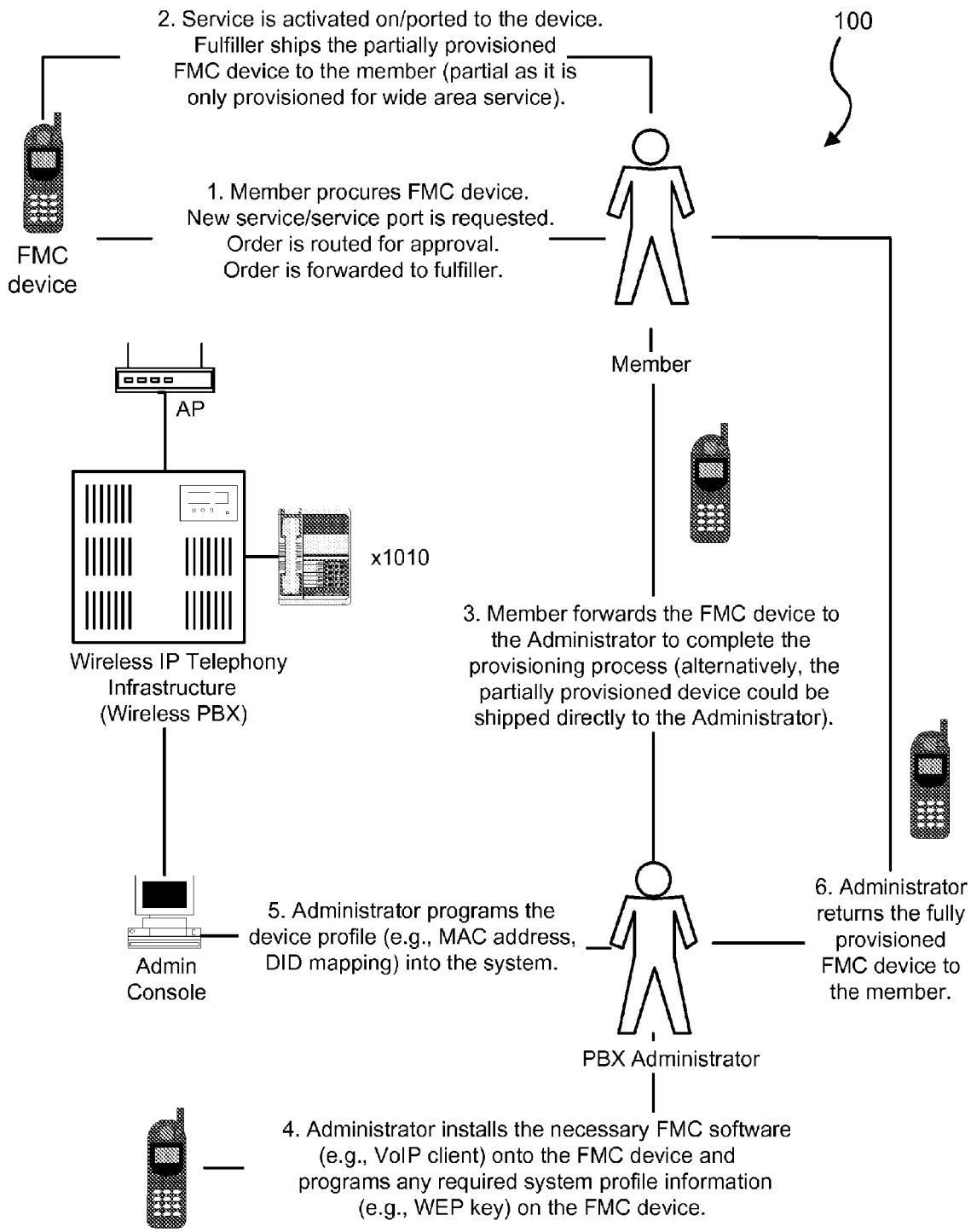
FIG. 1 is a flow diagram illustrating an embodiment of a conventional method for procuring and provisioning an FMC device.
Figure 2:
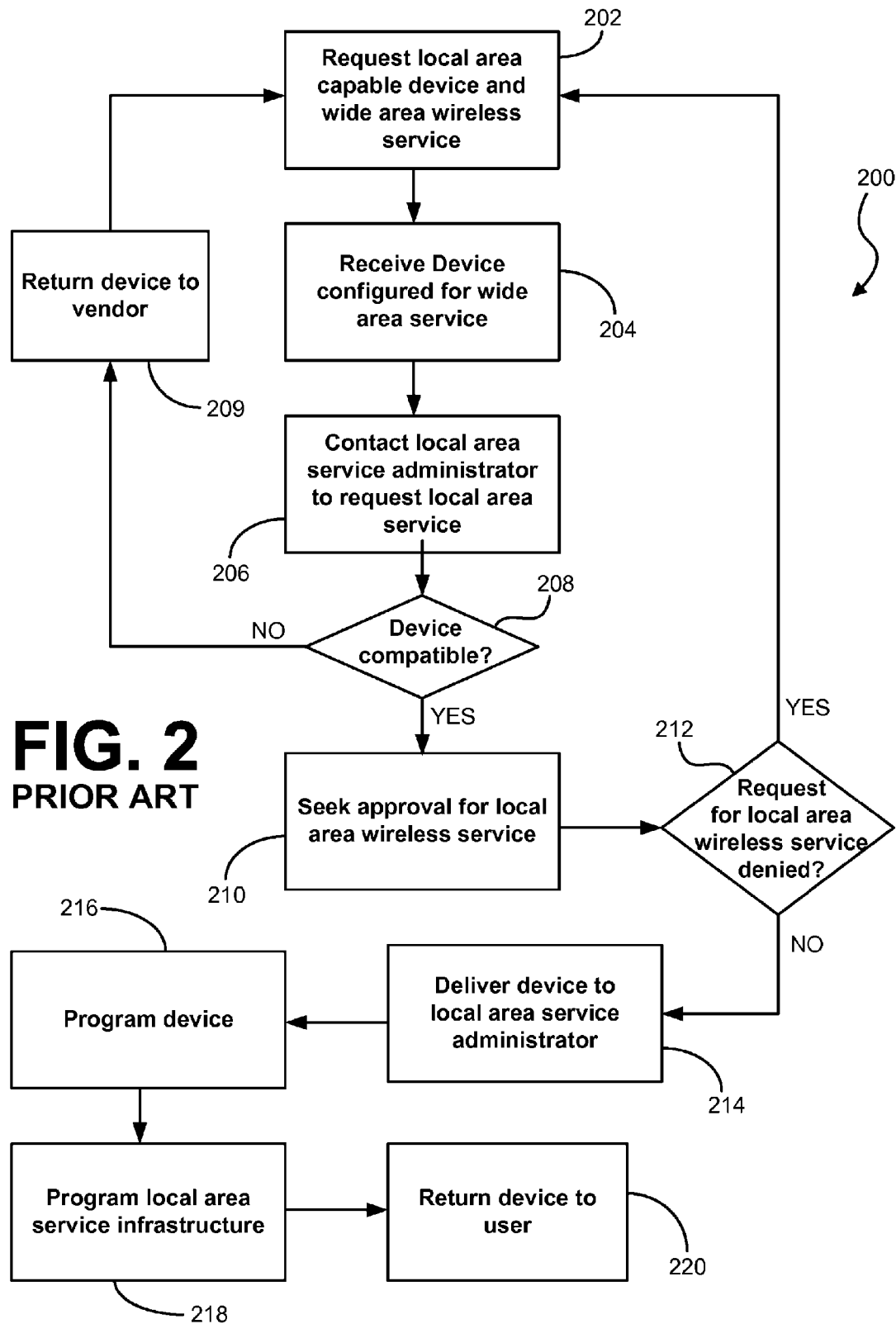
FIG. 2 is a flow diagram illustrating another embodiment of a conventional method for procuring and provisioning an FMC device.
Figure 3:
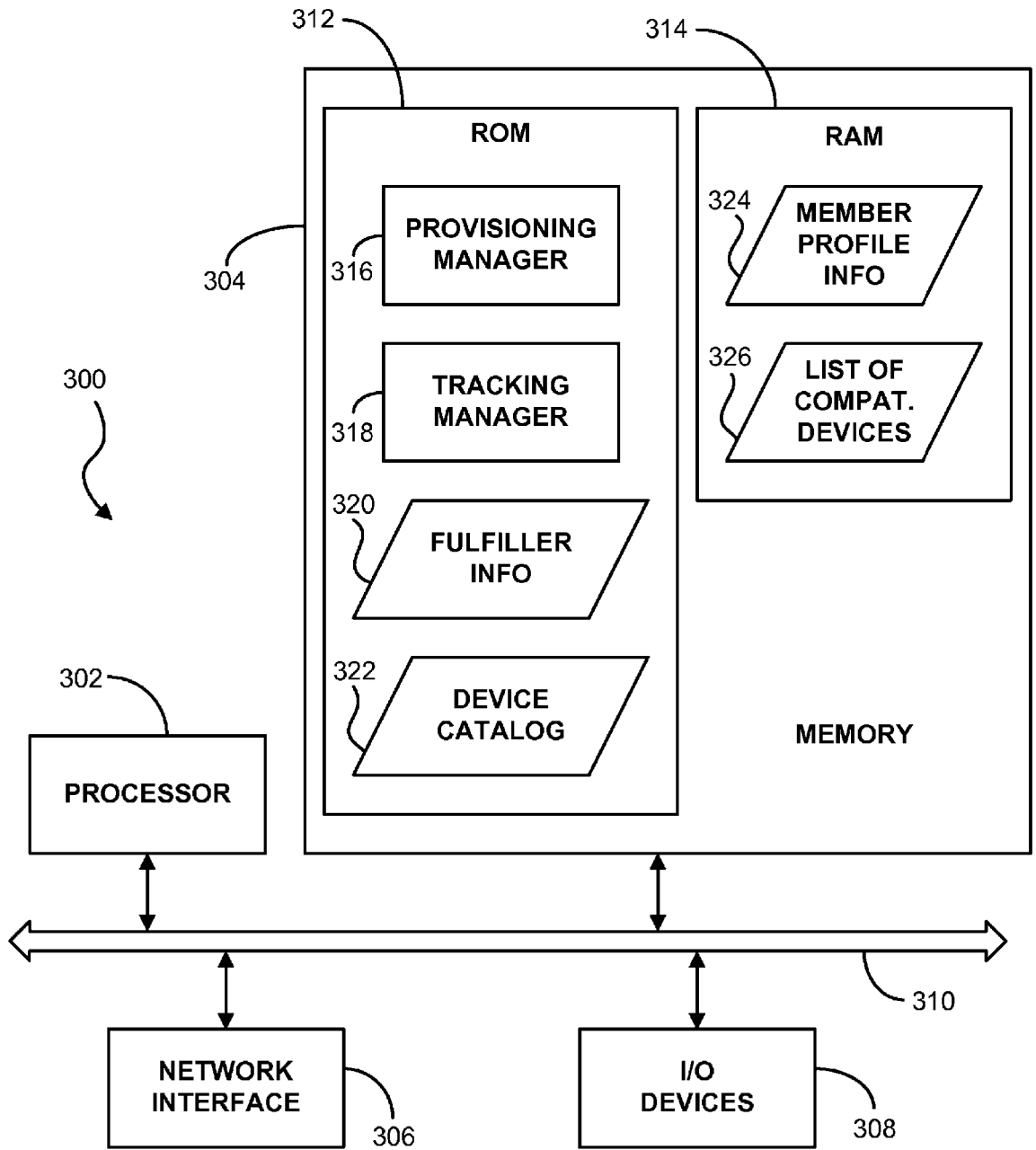
FIG. 3 is a block diagram illustrating an embodiment of a provisioning management device.

FIG. 3 is a block diagram illustrating an embodiment of a provisioning management device 300. The provisioning management device 300 includes, among other things, a processor 302, memory 304, a network interface 306, and input/output devices 308, each connected to an internal bus 310. The memory 304 includes, among other things, a read-only memory (ROM) component 312 and a random access memory (RAM) component 314. The ROM component 312 includes, among other things, a provisioning manager 316, a tracking manager 318, fulfiller information 320, and a device catalogue 322. The RAM component 314 includes, among other things, a member profile information register 324 and a compatible devices register 326.

The processor 302 controls the operations of the provisioning management device 300 and executes software stored in the memory 304. The provisioning manager 316 of memory 304 includes logic or software for managing the provisioning of a member device, such as an FMC device. Details of the operations and functions of the provisioning manager 316 are described more fully below. The network interface 306 provides a communication path between the provisioning management device 300 and a network (not shown), such as the Internet. In this way, the provisioning management device 300 can communicate with a member or procurer, who can access the provisioning management device 300 when necessary. The I/O devices 308 of the provisioning management device 300 may include, for example, various peripheral devices, such as computer monitors, printers, keyboards, etc., allowing communication with a system operator or other administrator who operates or maintains the provisioning management device 300.

The provisioning management device 300 can be placed in any suitable facility or location where the network interface 306 can properly communicate with the network. In this way, the network interface 306 can be associated with a web address or URL, for example, and the member or procurer can provide requests via the network interface 306. In some embodiments, the network interface 306 is omitted from the provisioning management device 300. In this latter case, the system operator or administrator can manually enter data received from the member or procurer by way of other input mechanisms or methods, such as by telephone, facsimile, e-mail, etc.

The provisioning management device 300 can be implemented in association with the Internet or World Wide Web. Alternatively, instead of implementing the provisioning management device 300 via use of the Internet, the device may be implemented via use of a first transmitting and receiving device such as, but not limited to, a modem located at a customer premises, which is in communication with a second transmitting and receiving device such as, but not limited to, a modem located at a central office. In accordance with such an embodiment, personal computers may be located at the customer premises and the central office having logic provided therein to perform functions in accordance with the provisioning management device 300.

Furthermore, the provisioning management device 300 and provisioning manager 316, in whole or in part, can be implemented in software, hardware, or a combination thereof. In some embodiments, the provisioning manager 316 is implemented in software or firmware and stored in memory 304 of the provisioning management device 300. In this respect, the provisioning manager 316 is executed by a suitable execution system, such as processor 302. If implemented in hardware, as in alternative embodiments, the provisioning manager 316 can be implemented with any combination of discrete logic circuitry or as an application-specific integrated circuit (ASIC), programmable gate array (PGA), field programmable gate array (FPGA), etc.

The provisioning manager 316, when implemented in software, can be stored on any suitable computer-readable medium for use by or in connection with an instruction execution system, apparatus, or device, such as a computer-based system, processor-containing system, or other system. In the context of the present disclosure, a "computer-readable medium" can be any means that can contain, store, communicate, propagate, or transport the program for use by or in connection with the instruction execution system, apparatus, or device. The computer-readable medium, for example, may be magnetically stored and transported on a conventional portable computer diskette. The computer-readable medium can be, for example but not limited to, an electronic, magnetic, optical, electromagnetic, infrared, or semiconductor system, apparatus, device, or propagation medium.

With continued reference to FIG. 3, it should be noted that the provisioning management device 300 may be configured to provide provisioning service to any number of clients via client servers, processors, etc. As an example, if five separately located clients utilize the provisioning management device 300, five separate client processors may be connected to a single client server, or five separate client servers. The client processor(s) may be any suitable device, such as a personal computer, laptop, workstation, or mainframe computer, for accessing the provisioning management device 300. Furthermore, the network interface 306 may be configured with security and encryption hardware and/or software for the purposes of ensuring the confidentiality of information transmitted within and between the respective networks.

A procurer request for an FMC device, wide area wireless service, and local area service can be made via a procurement request form, such as one rendered via the Internet or using other electronic mechanisms. In some embodiments, requests can be made by voice commands or using paper forms mailed or transmitted via facsimile to a facility that houses the provisioning management device 300. The received request can be entered automatically into the provisioning management device 300 or entered manually using input devices 308.

Executing the provisioning manager 316, the processor 302 analyzes the request to determine the compatibility, viability, and/or validity of the requested elements, including, but not limited to, parameters, characteristics, limitations, etc. of the user device, wide area service provider, and/or local area service provider or infrastructure. Once compatibility has been verified, the processor 302 routes the device/services request for approval to an appropriate entity. In some embodiments, the entity may be a table or database correlating various compatibility parameters. If the request is approved, the request is split into multiple, e.g. three, separate provisioning requests. One request is used, for example, to order a requested user device. Other requests may correspond to, for example, wireless wide area service and wireless local area service, or other types or numbers of multiple services.

The provisioning management device 300 of FIG. 3, in some embodiments, can be combined or incorporated with service plan optimization systems. For example, the provisioning management device 300 can be combined with U.S. patent application Ser. No. 09/758,816, entitled "System and Method for Analyzing Wireless Communication Records and for Determining Wireless Communication Service Plans", filed Jan. 11, 2001, now U.S. Pat. No. 6,681,106, which is incorporated by reference herein.

Figure 4:
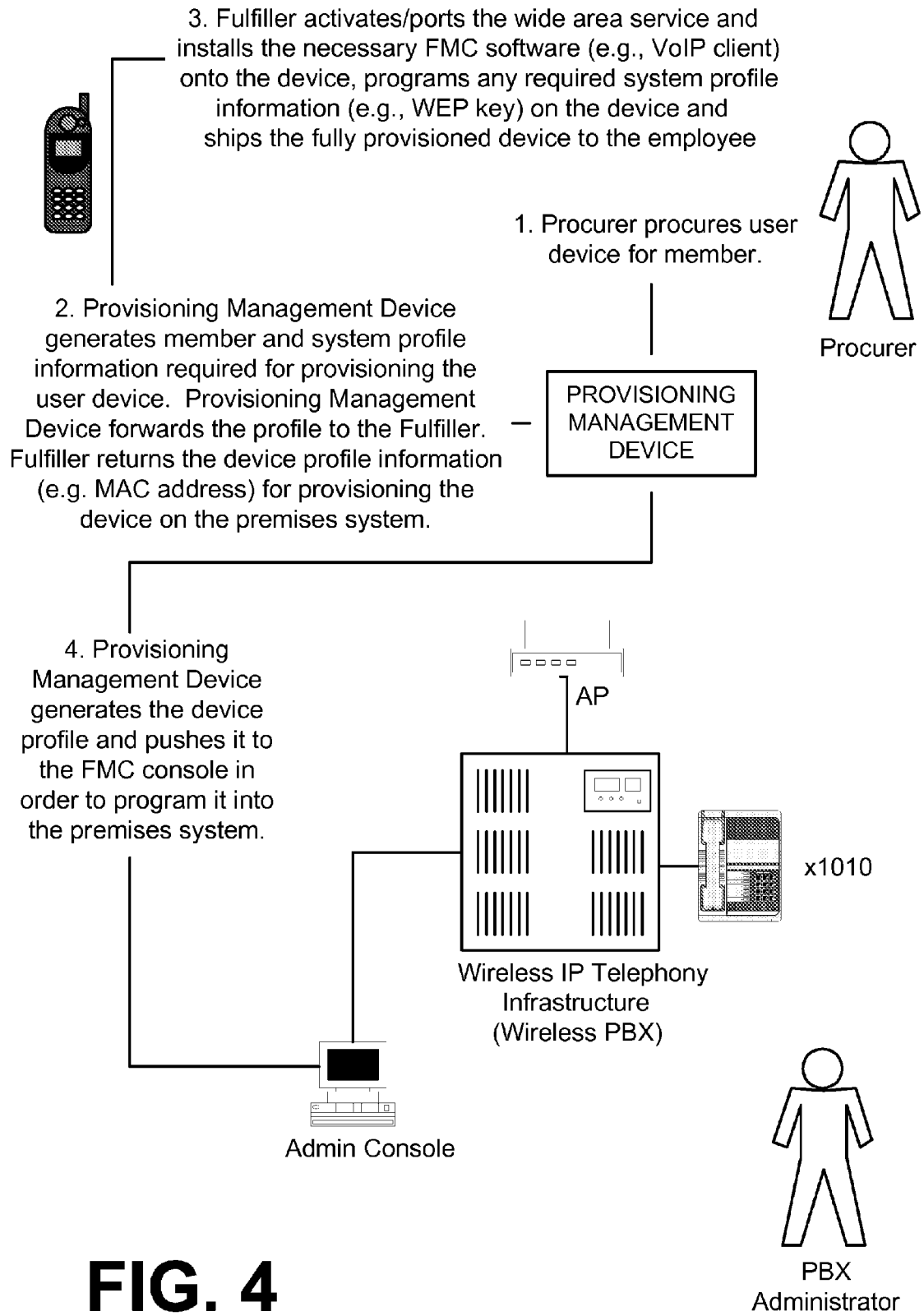
FIG. 4 is a flow diagram illustrating an embodiment of a method or business method for utilizing the provisioning management device of FIG. 3 for procuring and provisioning a user device.

FIG. 4 is a diagram illustrating an embodiment of a task flow for provisioning a member device using, for instance, the provisioning management device 300 of FIG. 3. In a first step, the member or procurer communicates with the provisioning management device 300 or an administrator of the provisioning management device 300. The member can utilize the provisioning management device 300 to procure an FMC service. The provisioning management device 300 generates the subscriber and system profile information required for provisioning the device for wide area service and local area service. The provisioning management device 300 then forwards the profile to a "fulfiller" and receives the necessary device profile information, e.g. MAC address, from the fulfiller required to provision the device on the premises system. The fulfiller can be any suitable entity for fulfilling an order for a device or services. For example, the fulfiller can be vendor, agent, the member himself, or others.

The fulfiller activates or ports the wide area service and installs the necessary FMC software, e.g. VoIP client, onto the device. The fulfiller also programs any required system profile information, e.g. WEP key, on the device and ships the fully provisioned device to the member. As can be seen from this task flow of FIG. 4, the tasks required by the member are minimized compared to the complex procedures needed for the conventional business processes. This simplified task flow can be used as a business model for simplifying the procuring process for member devices, such as FMC devices. The task flow of FIG. 4 also can be used to provide a fully provisioned device to the member in a more timely manner. Also, many of the inconveniences of the conventional model are overcome by utilizing this task flow or business method shown in FIG. 4. Other benefits may become apparent to one of ordinary skill in the art to make the procurement process simpler for the procurer.

Figure 5:
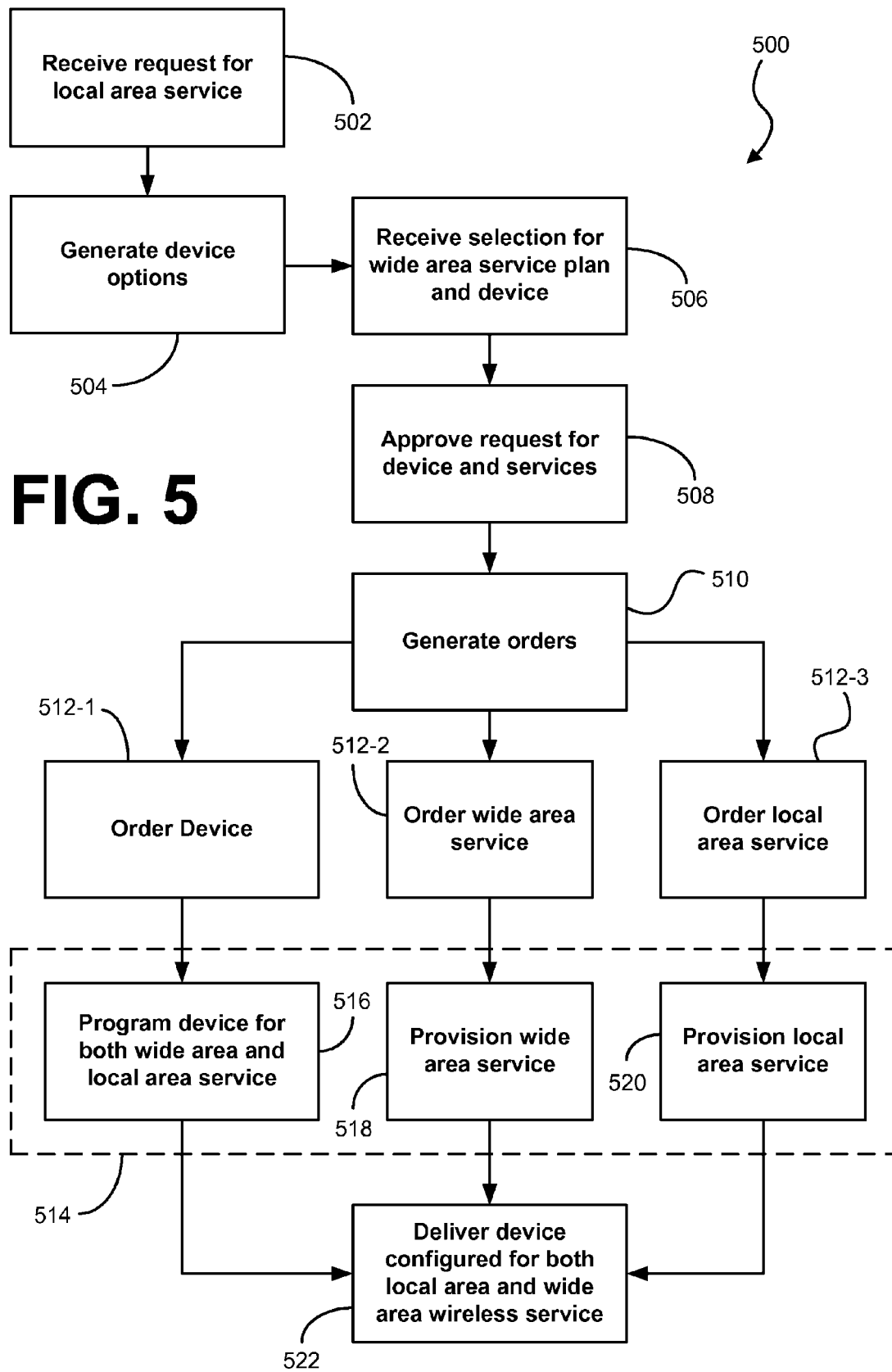
FIG. 5 is a flow diagram illustrating another embodiment of a method or business method for utilizing the provisioning management device of FIG. 3.

FIG. 5 is a flow diagram of an embodiment of a method 500, such as a business method, which can be performed in whole or in part by the provisioning management device 300 of FIG. 3. The method 500 includes receiving a request for a local area service, such as a local area wireless telephone service, as indicated in block 502. Block 504 includes generating device options for the procurer based on the local area service request. In block 506, a selection of a wide area service and user device is received. In response to the selections received in blocks 502 and 506, the method 500 includes automatically determines whether or not the request for the device and services is approved, as indicated in block 508.

Upon approval in block 508, block 510 is executed in which orders for the user device and services are generated. At this point, orders are given to separate entities at substantially the same time in order to coordinate orders and responses to the orders to better push the procurement of the user device to completion. A first order is sent as a device order (block 512-1), a second order is sent as an order for a wide area service (block 512-2), and a third order is sent as an order for a local area service (block 512-3). It should be recognized that generating orders associated with block 510 may include the orders 512-1, 512-2, and 512-3, as illustrated, or may include, in alternative embodiments, additional or different types of orders depending on the particular application. If additional services are to be provisioned in addition to local and wide area services, then additional orders are sent to the appropriate entities for fulfillment. Furthermore, the orders 512-1, 512-2, and 512-3 may be sent to one or more entities, depending on the application.

In response to orders, block 514, which comprises blocks 516, 518, and 520, includes the step of fulfilling the orders. Orders are fulfilled at substantially the same time or in any suitable sequence to properly provision the user device. In block 516, the user device is programmed for both wide area and local area service. In block 518, the wide area service is provisioned according to order 512-2. In block 520, the local area service is provisioned according to order 512-3.

Once the user device has been provisioned for local and wide area services, the user device is delivered to the member, who can immediately begin using the user device according to the local area service plan and wide area service plan. Since no additional tasks are required for provisioning the user device at this point, the business method 500 can provide the member with a fully provisioned device that can be used upon receipt, instead of requiring additional, and sometimes frustrating, tasks and/or delays as is common in conventional business methods.

The business method of FIG. 5 includes steps or processes that can be modified without departing from the spirit and scope of the present disclosure. By centralizing the provisioning process for a user device, such as an FMC device or other device that is capable of multiple services, the process can be simplified for procurers and other administrative staff members. In this way, by utilizing the method of FIG. 5, members of businesses, schools, government agencies, households, and other entities can more easily provision user devices without the usual complexity common today. It should be recognized that each step or process of FIG. 5 could be performed in a variety of ways. As examples, FIGS. 6-10 include flow charts and block diagrams of certain blocks of FIG. 5 to more clearly define possible implementations of the individual steps.

Figure 6:
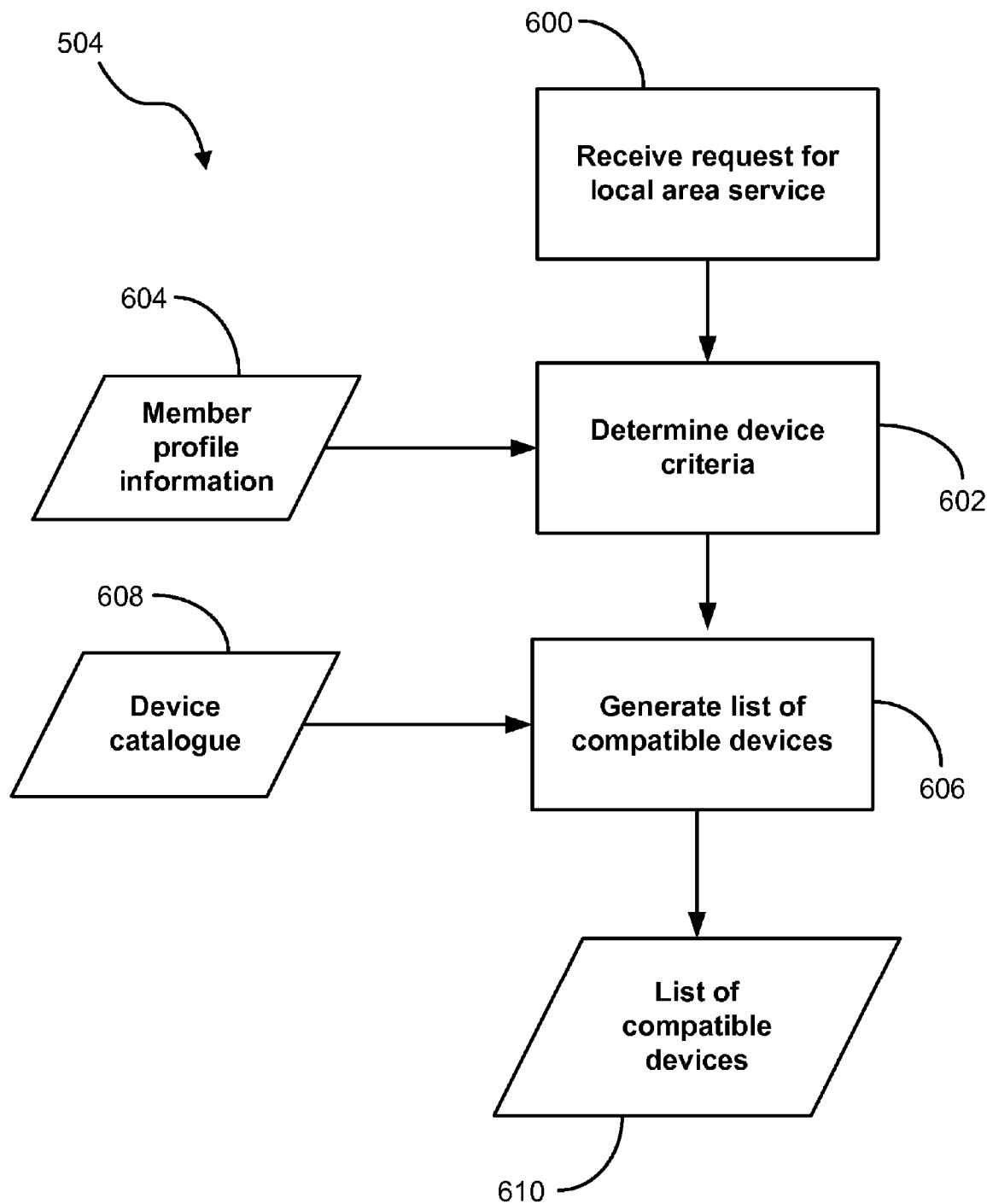
FIGS. 6-10 are flow diagrams illustrating embodiments of individual steps of the method of FIG. 5.

FIG. 6 is a flow diagram of an embodiment of the device option generating step 504 shown in FIG. 5. In response to receiving a request for a local area service (block 600), block 602 includes determining user device criteria, based on member profile information 604. For example, member profile information 604 may include limiting criteria, such as member location, member authority or status within a business, or other criteria that might limit the device choices. In block 606, a list of compatible devices is generated based on the device criteria. The list is also generated based on available devices in a device catalogue 608, for example. The list of compatible device 610 is stored for later selection.

Figure 7:
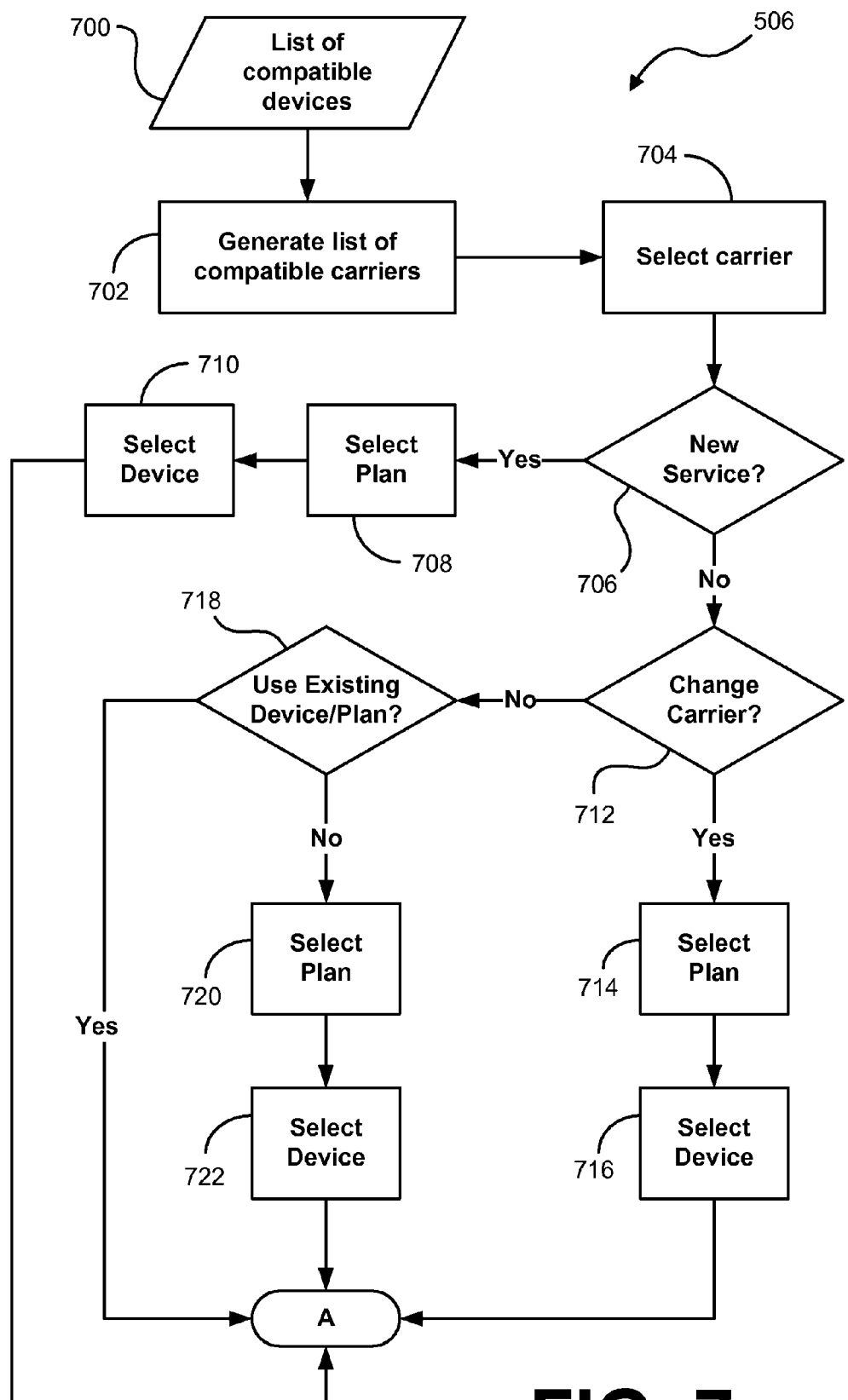

FIG. 7 is a flow diagram of an embodiment of the selection receiving step 506 shown in FIG. 5. In this embodiment, the list of compatible devices 700 is provided to block 702, where the list of compatible carriers is generated. In block 704, a carrier is selected. In decision block 706, it is determined whether or not a wide area service plan for selection is a new service. If it is new, the flow diagram proceeds to block 708, in which a plan is selected. Also, a device is selected as indicated in block 710. If the selected wide area service is determined in block 706 not to be new, then flow proceeds to decision block 712, in which it is determined whether or not a selected carrier is changed from a previous service. If the carrier has changed, flow proceeds to block 714, in which a plan is selected, and block 716, in which a device is selected. If it is determined in block 712 that the carrier is not changed, then flow proceeds to decision block 718. In block 718, it is determined whether or not an existing device or plan is being used. If so, no further steps are performed for making selections. If an existing device or plan is not used, then flow proceeds to block 720, in which a plan is selected, and block 722, in which a device is selected.

Figure 8:
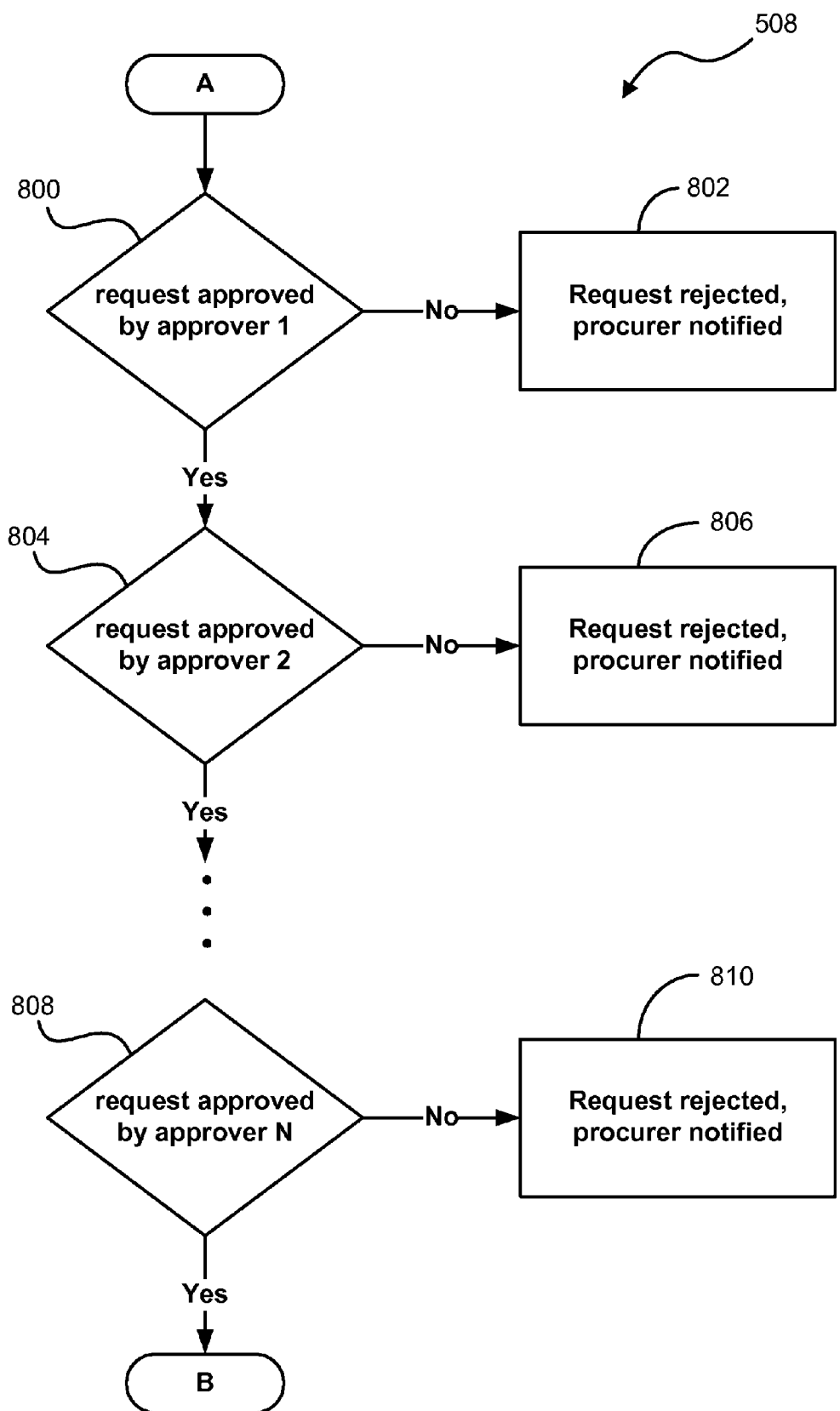

FIG. 8 is a flow chart illustrating an embodiment of the approval step 508 shown in FIG. 5. Selections for a user device and multiple associated services to be provided by way of the user device may require approval. In some embodiments, approval for certain devices and/or services may be incorporated within the selection process itself. In this respect, the selection of devices and/or services is limited by member information that may be known at the time of selection. Approval may depend on various criteria and may require checking with different administrators.

In the embodiment of FIG. 8, decision block 800 includes determining if the request for selections is approved by a first approver. The first approver may be a person, such as an administrator, or an automatic response mechanism. If the request is not approved, then flow goes to block 802, which indicates to the procurer that the request has been rejected. Block 804 includes determining whether or not the request is approved by a second approver. If not, the procurer is notified that the request was rejected. Approval is checked for any number N of approvers. In this embodiment, a decision block 808 includes determining whether the request is approved by the last approver. If the request passes all levels of approval, flow proceeds to the order generating step 510 shown in FIG. 5.

Figure 9:
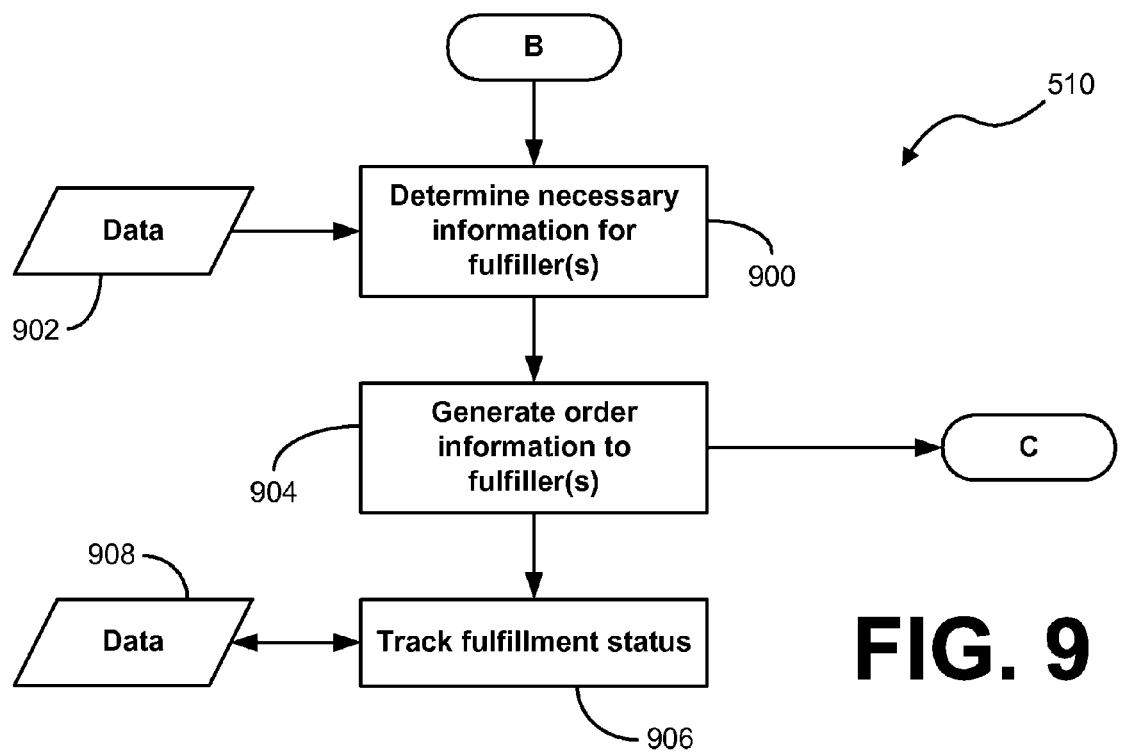

FIG. 9 is a flow diagram of an embodiment of the order generating step 510. In this implementation, the information necessary to be sent to the fulfiller(s) for fulfillment is determined as indicated in block 900. The necessary information can be extracted from a database that stores the relevant data 902. In block 904, the order information to be sent to the fulfiller(s) is generated. At this time, the generated order of block 904 is tracked in block 906 to determine the status of fulfillment of the order. Other data 908 may be used to track the fulfillment status.

Figure 10:
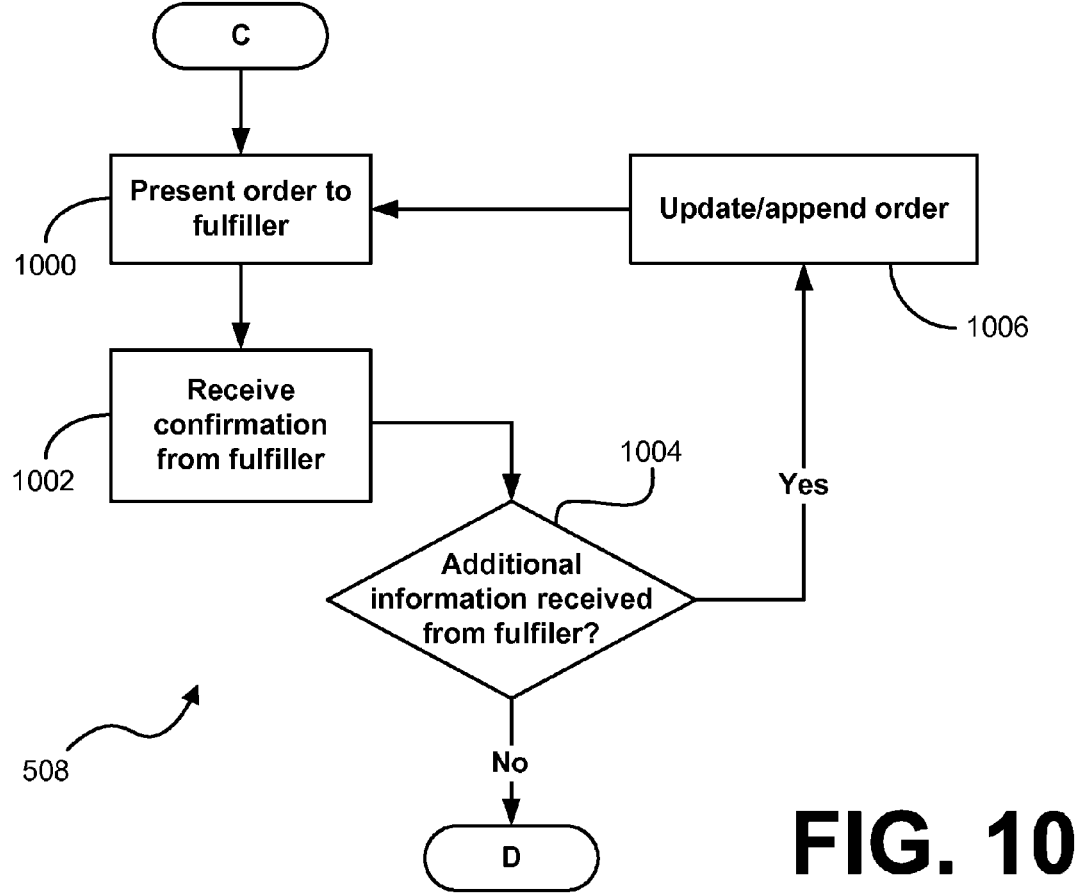

FIG. 10 is a flow chart of an embodiment of the ordering step 512, which may include one or more of the ordering steps 512-1, 512-2, or 512-3 shown in FIG. 5. In this embodiment, the ordering step 512 includes presenting an order to be fulfilled to a fulfiller as described in block 1000. Block 1002 includes receiving confirmation from the fulfiller. Confirmation information may include simply an acknowledgement that the order has been received or can include information that might affect the order with respect to other selections. In block 1004, it is determined whether additional information has been received from the fulfiller that might affect the current order. If so, the flow proceeds to block 1006 in which the order can be updated, changed, or appended. From block 1006, flow returns back to block 1000 to present the new order to the fulfiller(s). If it is determined in block 1004 that additional information has not been received, then the order is considered to be acceptable.

Any process descriptions or blocks in flow diagrams illustrated or described in the present disclosure should be understood as representing modules, segments, or portions of code which include one or more executable instructions for implementing specific logical functions or steps in the process. Alternative implementations are also included within the scope of the present disclosure. For instance, some functions or operations may be executed or performed out of order from that shown or discussed, including functions or operations executed substantially concurrently or in reverse order, depending on the functionality involved.

Figure 11:
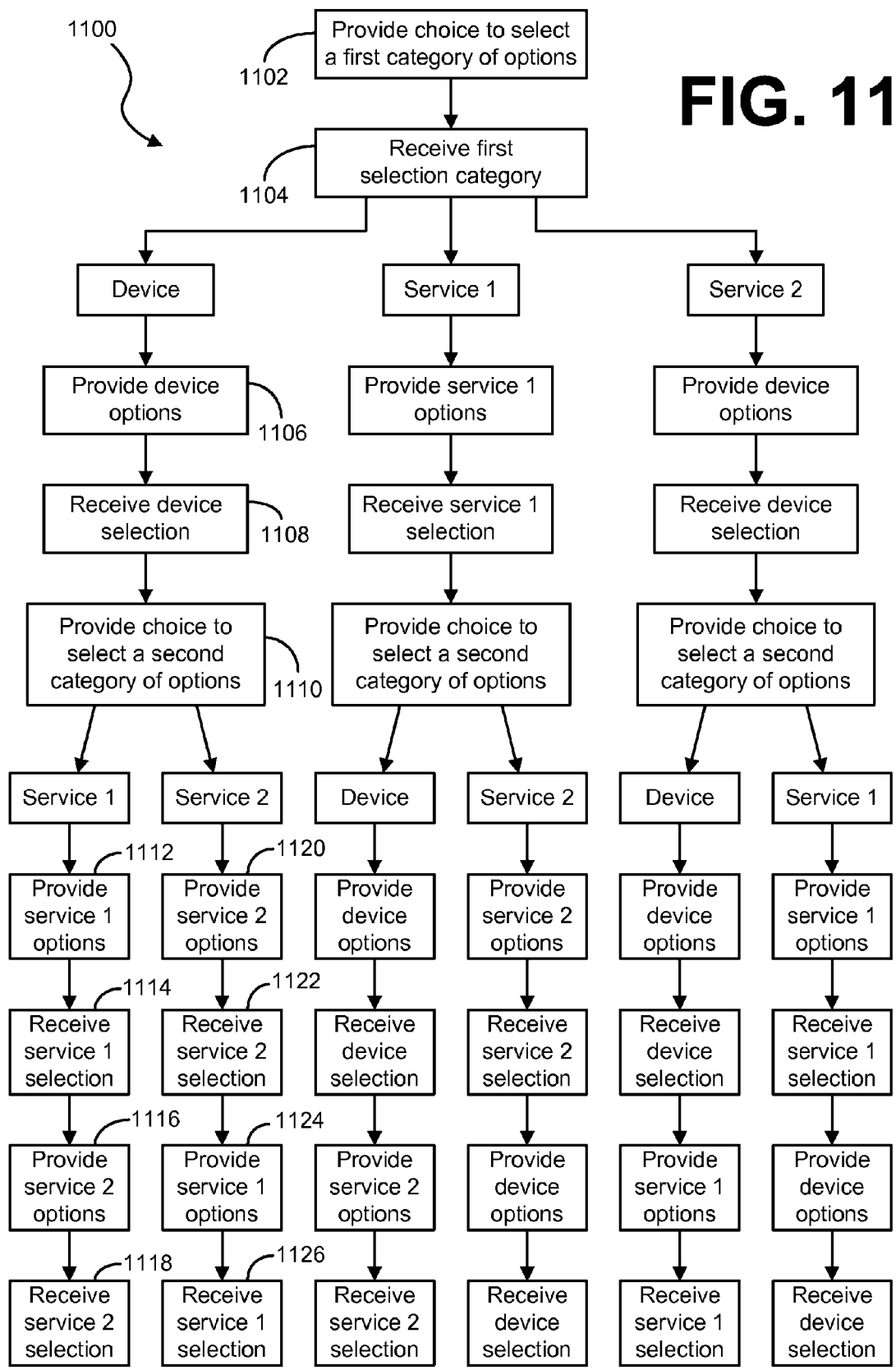
FIG. 11 is a flow diagram illustrating an embodiment of a method for selecting a device and associated services.

FIG. 11 is a flow diagram of another embodiment of a method or process 1100, such as a business method, for provisioning a user device. In block 1102, a choice is provided to select a first category of options. In some embodiment, the choice can be provided to a procurer by way of a web site. In this respect, the procurer can select one of multiple categories to start the selection routine. In the field of FMC devices, for example, the categories to choose from may include a device, i.e. an FMC device, a first service, e.g. a local area wireless service, and a second service, e.g. a wide area wireless service. The method 1100 can be used in other fields for provisioning a user device when two or more services can be provided to a subscriber via the user device. Although two services, i.e. service 1 and service 2, are illustrated in FIG. 11, it should be understood that method 1100 may include any number of services, depending on the particular user device and services available.

In block 1104, a first selection category is received from the procurer. If the procurer chooses to first select a device, which may be applicable when the procurer wishes to determine services after a particular device is selected, then the method 1100 flows down the branch under the "device" heading. If service 1 is selected, the method 1100 flows down the second branch under "service 1". And if service 2 is selected, the method 1100 flows down the third branch under "service 2".

When a device is chosen as the category to be selected first, flow proceeds to block 1106, in which the device options are provided to the procurer. Then the procurer's device selection is received as indicated in block 1108. Once the device is selected, block 1110 provides a choice to select a second category of options. Since the user device is already at this point, the category selections include the first service (service 1) and the second service (service 2). If the procurer selects "service 1" as the second category for selection, flow proceeds to the sub-branch under "service 1". If "service 2" is selected, flow proceeds down the second sub-branch under "service 2". When service 1 is selected, block 1112 describes that the service 1 options are provided. The available service 1 options may be limited based on the user device selection and the particular specifications and capabilities of the user device. In block 1114, the procurer's selection of the service 1 options is received.

When the device and service 1 are selected, block 1116 indicates that the service 2 options are provided. The service 2 options are defined by the device and service 1 characteristics, parameters, specifications, capabilities, etc. The method 1100, in some embodiment, may provide only those service 2 options that are available using the selected user device under service 1. In block 1118, the service 2 selection is received. When service 2 is selected in block 1110, the service 2 options are provided (block 1120) and service 2 selection is received (block 1122). Then the service 1 options are provided (block 1124) and service 1 selection is received (block 1126).

This process is described with respect to the paths based on a first selection category of "device" in block 1104. The branches for the service 1 and service 2 selection as the first category contain similar steps as those described above with respect to the device branch. It should be recognized that several paths can be followed that result in the same selections. However, by selecting one category that may represent a previously existing selection, the options from that standpoint can be determined. The order of providing options to the procurer and receiving selections from the procurer is based on the particular selection order. The different permutations of selection for three categories can be expanded to accommodate additional selection categories, such as additional services or device features or add-ons. In addition, devices may be configured or provisioned by authorizing or decoding built in software that may be inoperable without prior authorizing or decoding processes.

The above-described embodiments of the present disclosure represent possible examples of implementations, which are merely set forth for a clear understanding of the principles of the present disclosure. Many variations and modifications may be made to the embodiments described herein without departing substantially from the spirit, scope, and principles of the present disclosure. For example, some steps or actions described herein as being automatic or associated with processor execution may actually be done manually. All such modifications and variations are intended to be included herein within the scope of the present disclosure and protected by the following claims.

We claim at least the following:

1. A method comprising:
   receiving in a computer system a first request to procure a user device capable of operating under a plurality of service plans;
   receiving in the computer system a second request to provision the user device for operation under a first service plan, wherein the first service plan is associated with a wireless local area network (WiLAN) service;
   generating in the computer system a list of selectable user devices in response to the second request;
   receiving in the computer system a third request to provision the user device for operation under a second service plan;

coordinating in the computer system the first request, second request, and third request to provision the user device under the first service plan and second service plan; and providing the first request, second request, and third request to an administrator for approval.

2. The method of claim 1, wherein the second service plan is associated with a wireless wide area network (WiWAN) service.

3. The method of claim 1, further comprising:
generating orders in the computer system for the requested user device, first service plan, and second service plan;
sending from the computer system the orders for the requested user device, first service plan, and second service plan to one or more entities capable of fulfilling the orders;
managing the orders to invoke the provisioning of the user device with the first service plan and second service plan at substantially similar times.

4. The method of claim 1, further comprising:
delivering from the computer system the user device provisioned under the first service plan and second service plan to a procurer of the user device.

5. The method of claim 1, further comprising:
receiving in the computer system one or more additional requests for provisioning the user device for one or more additional service plans; and
coordinating from the computer system the first, second, third, and additional requests to provision the user device under the first, second, and additional service plans.

6. A method comprising providing a provisioning agent that:
receives in a computer system a first request to procure an electronic device, a second request to provision the electronic device for a first communication service, and a third request to provision the electronic device for a second communication service;
provides orders in the computer system to one or more additional agents, the orders including instructions for the additional agents to provision the electronic device for the first communication service and the second communication service;
providing from the computer system the first request, second request, and third request to an administrator for approval; and
providing orders to one or more remote locations by configuring an instructing means located at the one or more remote locations for fulfillment of the orders, to install software onto the electronic device and programming profile information on the electronic device,
wherein the first communication service is associated with a wireless local area network (WiWAN) service and the second communication service is associated with a wide area service.

7. The method of claim 6, wherein the electronic device is a Fixed-Mobile Converged (FMC) device.

8. The method of claim 6, further comprising:
forwarding profile information from the computer system, which is used by the instructing means to provision the electronic device, to an organization for storage on the premises of the organization.

9. The method of claim 6, further comprising:
enabling a procurer to select a first category of options in the computer system prior to receiving the first, second, and third requests;
enabling the procurer to select a second category of options in the computer system prior to receiving the first, second, and third requests; and
enabling the procurer to select a third category of options in the computer system prior to receiving the first, second, and third request;
wherein the categories of options correspond to device options, first communication service options, and second communication service options.

10. The method of claim 6, further comprising:
receiving in the computer system one or more additional requests to provision the electronic device for one or more additional communication services.

11. The method of claim 6, wherein the provisioning agent receives request in a centralized facility.

12. The method of claim 11, wherein one or more of the additional agents fulfill the orders in the centralized facility.

13. A system comprising:
a processor; and
a memory configured to store a program executed by the processor for provisioning an electronic device, the program configured to:
receive a first request to procure a user device capable of operating under a plurality of service plans;
receive a second request to provision the user device for operation under a first service plan, wherein the first service plan is associated with a wireless local area network (WiLAN) service;
generate a list of selectable user devices in response to the second request;
receive a third request to provision the user device for operation under a second service plan;
coordinate the first request, second request, and third request to provision the user device under the first service plan and second service plan; and
provide the first request, second request, and third request to an administrator for approval.

14. The system of claim 13, wherein the program is further configured to:
generate orders in the computer system for the requested user device, first service plan, and second service plan;
send the orders for the requested user device, first service plan, and second service plan to one or more entities capable of fulfilling the orders;
manage the orders to invoke the provisioning of the user device with the first service plan and second service plan at substantially similar times.

15. The system of claim 13, wherein the program is further configured to:
initiate delivery of the user device provisioned under the first service plan and second service plan to a procurer of the user device.

16. The system of claim 13, wherein the program is further configured to:
receive one or more additional requests for provisioning the user device for one or more additional service plans; and
coordinate the first, second, third, and additional requests to provision the user device under the first, second, and additional service plans.

17. A non-transitory computer-readable storage medium having a stored computer program for execution by a processing device, the computer program comprising:
logic that allows a first request to be received at a centralized location;
logic that allows a second request to be received at the centralized location;

logic that allows a third request to be received at the centralized location;

logic configured to coordinate the first request, second request, and third request;

logic configured to generate a list of selectable user devices in response to the second request; and logic configured to provide the first request, second request, and third request to an administrator for approval;

wherein the first request is associated with an electronic device, the second request is associated with a first service being assisted by the electronic device, the first service plan being associated with a wireless local area network (WiLAN), and the third request is associated with a second service being assisted by the electronic device.

18. The non-transitory computer-readable storage medium of claim 17, wherein the logic configured to coordinate the requests comprises logic that generates a first order to procure the electronic device and generates second and third orders to provision the electronic device with the first service and second service.

19. The non-transitory computer-readable storage medium of claim 18, wherein the logic configured to coordinate the requests further comprises logic that tracks the first, second, and third orders.

20. A method, comprising the steps of:

receiving a first request in a computer system to procure a user device for a member of an organization, the user device capable of accessing a private network of the organization and a wireless wide area network (WiWAN);

receiving a second request in the computer system to provision the user device for operation under a first service plan for accessing the WiWAN;

receiving a third request in the computer system to provision the user device for accessibility to the private network of the organization coordinating the first request, second request, and third request in the computer system to provision the user device under the first service plan and for accessibility to the private network of the organization;

providing the first request, second request, and third request to an administrator within the organization for approval; and delivering the user device provisioned under the first service plan and second service plan to the member.

21. A method, comprising the steps of:

receiving a first request to procure a user device capable of operating under a plurality of service plans;

receiving a second request to provision the user device for operation under a first service plan, wherein the first service plan is associated with a wireless local area network (WiLAN) service;

generating a list of selectable user devices in response to the second request;

receiving in the computer system a third request to provision the user device for operation under a second service plan;

coordinating the first request, second request, and third request to provision the user device under the first service plan and second service plan; and providing the first request, second request, and third request to an administrator for approval;

wherein one or more steps are executed in a computer system.

\* \* \* \* \*